United States Patent [19]

Barney et al.

[11] Patent Number: 5,341,426
[45] Date of Patent: Aug. 23, 1994

[54] CRYPTOGRAPHIC KEY MANAGEMENT APPARATUS AND METHOD

[75] Inventors: George M. Barney, Scottsdale; Douglas A. Hardy; Craig R. Balogh, both of Mesa, all of Ariz.

[73] Assignee: Motorola, Inc., Schaumburg, Ill.

[21] Appl. No.: 991,054

[22] Filed: Dec. 15, 1992

[51] Int. Cl.⁵ .......................... H04L 9/00; H04L 9/30; H04L 9/08; H04L 9/12
[52] U.S. Cl. ........................................ 380/21; 380/28; 380/30; 380/43; 380/48; 380/49
[58] Field of Search .................... 380/9, 21, 23, 25, 28, 380/29, 30, 43, 44, 45, 46, 47, 49, 50, 48

[56] References Cited

U.S. PATENT DOCUMENTS

| | | | |
|---|---|---|---|
| 4,484,025 | 11/1984 | Ostermann et al. | 380/21 |
| 4,578,531 | 3/1986 | Everhart et al. | 380/21 |
| 4,691,355 | 9/1987 | Wirstrom et al. | 380/23 |
| 4,782,326 | 11/1988 | Bush | 380/28 X |
| 4,888,801 | 5/1988 | Foster et al. | 380/21 |
| 4,962,531 | 10/1990 | Sipman et al. | 380/24 |
| 5,093,860 | 3/1992 | Steinbrenner et al. | 380/21 |
| 5,179,591 | 1/1993 | Hardy et al. | 380/21 |
| 5,185,796 | 2/1993 | Wilson | 380/21 |
| 5,199,069 | 3/1993 | Barrett et al. | 380/28 |
| 5,230,020 | 7/1993 | Hardy et al. | 380/21 |

OTHER PUBLICATIONS

An article entitled "The Architectural Elements of a Symmetric Fault-Tolerant Multiprocessor", by A. Hopkins, Jr. et al., IEEE Trans. Comp., vol. C-24, No. 5, pp. 498-505; May, 1975.

*Primary Examiner*—Bernarr E. Gregory
*Attorney, Agent, or Firm*—Frederick M. Fliegel

[57] ABSTRACT

A method for establishing a secure communications link between first and second terminals includes a step of exchanging a first message. The first message contains information describing encryption devices and communications modes available within the terminals and user authentication information. The method also includes a step of selecting, in at least one terminal, a common key generation and ciphering algorithm. The method further includes steps of exchanging a second message for providing data to form traffic keys, exchanging a third message for synchronizing secure communications and initiating secure communication.

20 Claims, 4 Drawing Sheets

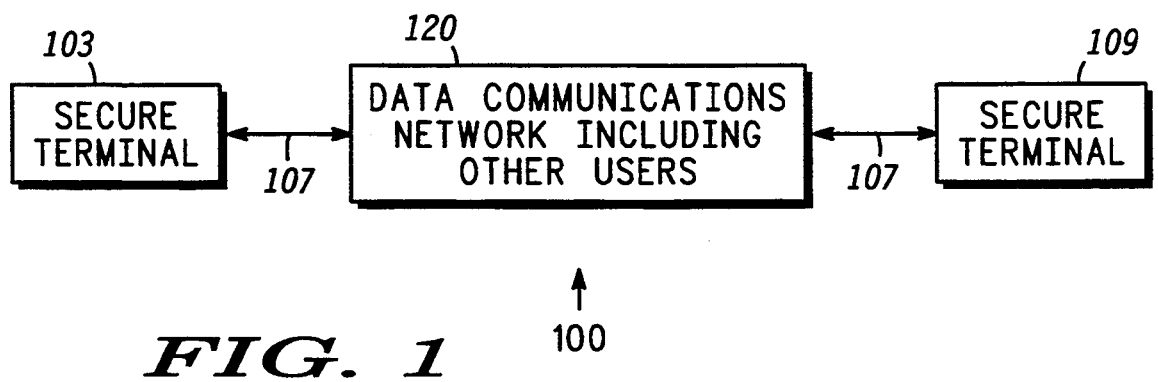
FIG. 1
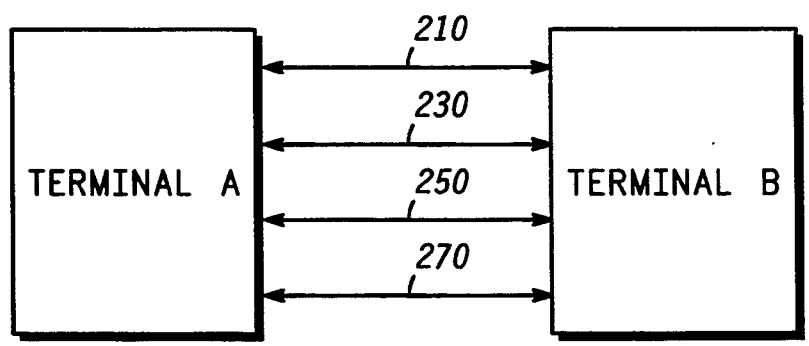
FIG. 2
FIG. 3
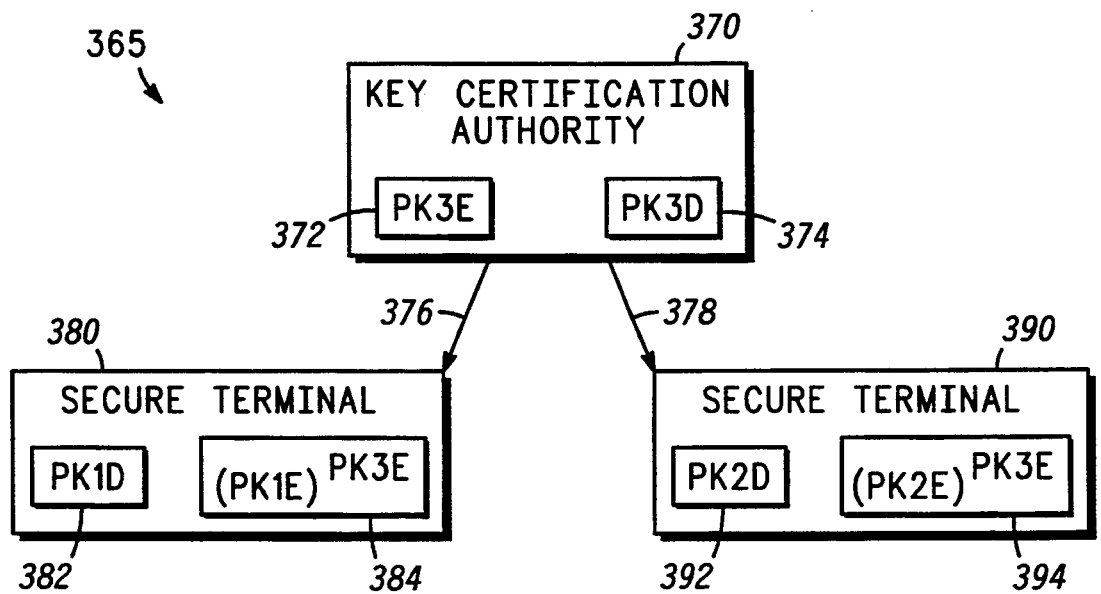

CRYPTOGRAPHIC KEY MANAGEMENT APPARATUS AND METHOD

The U. S. Government has a paid-up license in this invention and the right in limited circumstances to require the patent owner to license others on reasonable terms as provided for by the terms of Subcontract No. 7-AB1799-R-LR7 pursuant to Contract No. F19628-91-C-0124 awarded by the United States Air Force.

CROSS-REFERENCE TO RELATED APPLICATIONS

This application is related to co-pending U.S. patent application Ser. No. 07/767,706, filed Sep. 30, 1991, now U.S. Pat. No. 5,195,136, and to co-pending U.S. patent application Ser. No. 07/777,870, filed Oct. 16, 1991, now, U.S. Pat. No. 5,179,591, and to co-pending U.S. patent application Ser. No. 07/954,205, filed Sep. 30, 1992, now, U.S. Pat. No. 5,230,020, and to co-pending U.S. patent application Ser. No. 07/991,056, filed Dec. 15, 1992, which are all assigned to the same assignee as the present application.

1. Field of the Invention

The present invention concerns an improved apparatus and method for exchanging traffic keys for secure communications and more particularly to secure communication between user equipments employing slower data rates and/or having need for high speed communications.

2. Background of the Invention

Key distribution and management is important for many ciphering apparatus which require unique traffic keys for particular information exchanges.

Encryption systems using lower data rates suffer from lack of a way to rapidly establish and/or transfer per call traffic variables using a reduced number of bits or as few bits as possible.

Some methods for password distribution from a common source (e.g., a controller or key distribution center) are described, for example, in "Encryption System Key Distribution Method and Apparatus" by J. Everhard and J. Osborn, U.S. Pat. No. 4,578,531, or in "Hierarchical Key Management System" by R. Foster, R. Pfeifer and T. Mihm, U.S. Pat. No. 4,888,801. These methods are poorly suited to low data rate systems because of the number and length of the messages which are exchanged in establishing an authenticated traffic key.

The above-noted patents and patent applications are incorporated herein by reference.

What is needed are methods and apparatus for rapidly establishing authenticated traffic keys for use in low bit rate secure communications systems.

SUMMARY OF THE INVENTION

Accordingly, there is provided a new and improved secure communications apparatus for secure communications between a secure communications apparatus and another secure communications apparatus comprising encrypting apparatus for providing different encryption modes and communication modes, apparatus for sending a first capabilities message to and receiving a second capabilities message from the other secure communication apparatus, wherein the first and the second capabilities messages have predetermined data fields identifying different encryption modes and communication modes resident in the secure communication apparatus and in the other secure communication apparatus and a processor for comparing the first and the second capabilities messages to identify and select compatible encryption modes and compatible communication modes according to a stored preference protocol.

In a preferred embodiment the apparatus comprises an apparatus for secure communications between first and second terminals wherein the apparatus includes a plurality of different ciphering apparatus using different ciphering algorithms, a message transmitter, coupled to the different ciphering apparatus, a message receiver coupled to the different ciphering apparatus and a controller coupled to the different ciphering apparatus, the transmitter and the receiver. The controller, transmitter and receiver (i) send a first message to the second terminal. The first message contains information indicating encryption algorithms and communications modes available within the first terminal and describes terminal authentication information. A second message (ii) is sent to the second terminal which provides data to form a traffic key and (iii) secure communication is initiated with the second terminal using the traffic key.

The present invention provides an apparatus for secure communications which comprises a plurality of different data ciphering devices for encrypting input data to be transmitted and for decrypting received data to provide decrypted output data. Some of the plurality of different data ciphering devices require traffic keys of different lengths. The apparatus comprises a transceiver coupled to the plurality of different data ciphering devices. The transceiver exchanges encrypted data with another secure communication apparatus. The apparatus also includes a controller coupled to the transceiver and to the plurality of different data ciphering devices. The controller selects a first of the plurality of different data ciphering devices according to a predetermined preference hierarchy. The first of the plurality of different data ciphering devices creates a traffic key by exchanging messages with the another secure communication apparatus. The controller selects a second of the plurality of different data ciphering devices for using the traffic key to exchange encrypted data with the another secure communication apparatus.

The present invention provides a method for establishing a secure communications link between terminals, wherein each terminal follows a procedure including a step of exchanging an Authentication Package for Data. The Authentication Package for Data provides information including a description of ciphering and deciphering capabilities, certified user authentication data and a certified user public key. The method includes steps of transmitting a first Random Component Message including a first random number, receiving a second Random Component Message including a second random number, forming a traffic key from the first and second random numbers, interchanging Cryptographic Synchronization messages and initiating a secure information interchange.

The present invention further provides a method for establishing a secure communications link between first and second terminals. The terminals follow a procedure including steps of exchanging a first message containing information describing encryption devices and communications modes available within the terminals and user authentication information and selecting in at least one terminal a common key generation and ciphering technique. The method further includes steps of exchanging a second message for providing data to form traffic keys, exchanging a third message for synchronizing secure communications and initiating secure communication.

The first exchanging step of the method desirably but not essentially includes a step of selecting a common ciphering algorithm by means of an automatic programmed hierarchy of secure information interchange methods.

The second exchanging step of the method further desirably but not essentially includes generating a first random number in the first terminal, generating a second random number in a second terminal, exchanging random numbers and forming a third random number from the first and second random numbers to provide a traffic key in each terminal.

BRIEF DESCRIPTION OF THE DRAWING

A more complete understanding of the present invention may be derived by referring to the detailed description and claims when considered in connection with the figures, wherein like reference numbers refer to similar items throughout the figures, and:

FIG. 1 is a schematic diagram of a secure communication system using a data communications network in accordance with the present invention;

FIG. 2 is an illustration of a portion of the message sequence for initiating secure communication in accordance with the present invention;

FIG. 3 is a simplified block diagram of a portion of a secure communications system in accordance with the present invention;

DETAILED DESCRIPTION OF THE DRAWING

Figure 4:
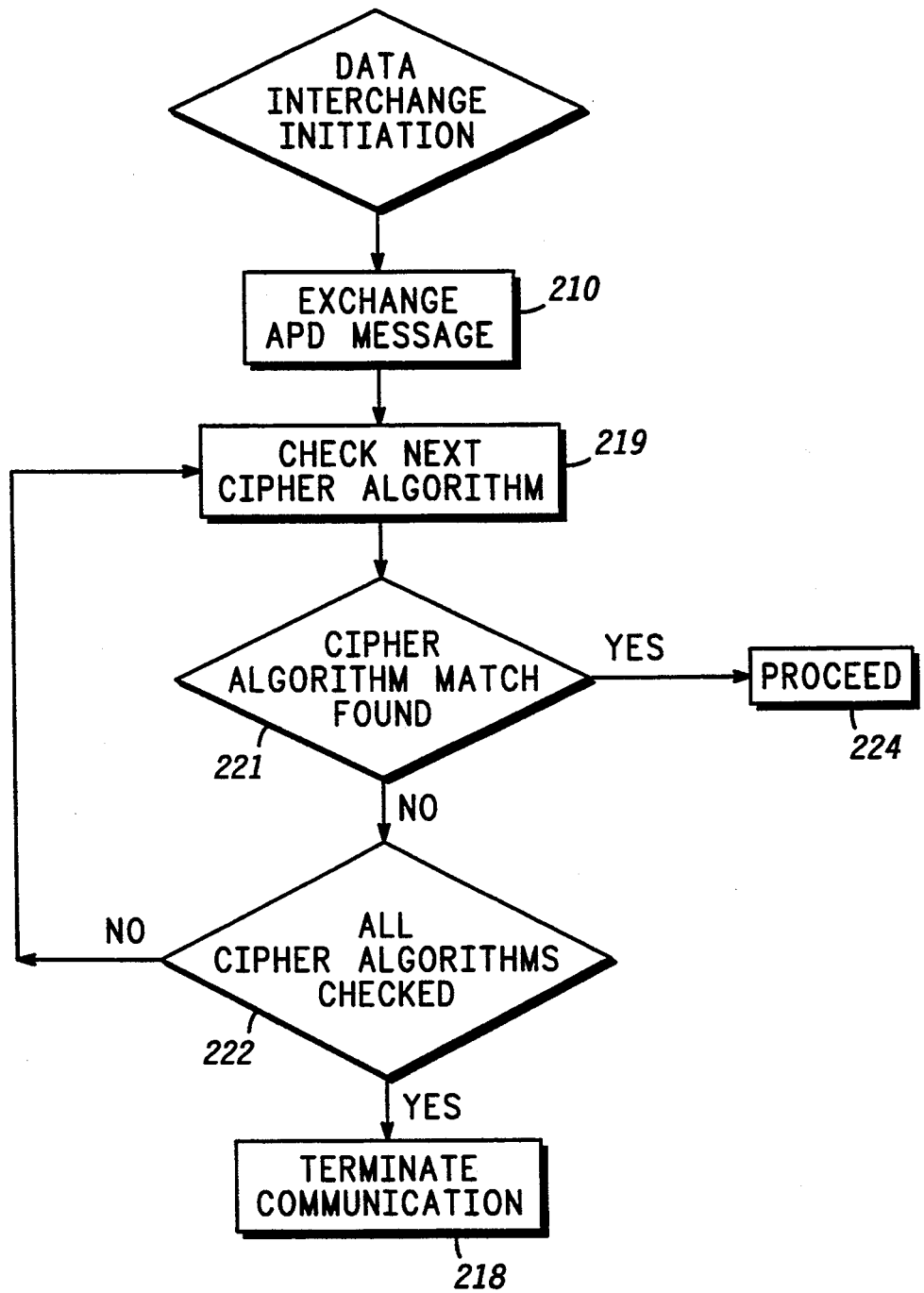
FIG. 4 is a flow chart illustrating the cipher algorithm matching process in accordance with a preferred embodiment of the present invention.

As used herein the words "encryption", "enciphering" and "encoding" mean conversion of a plain-text message to a secure message, while "decryption", "deciphering" and "decoding" refer to the inverse of this process. The term "random" is used herein to mean "pseudorandom" for the sake of brevity and in accordance with usage common in the art to which the invention pertains.

FIG. 1 illustrates secure communication system 100, comprising data communications network 120, data links 107, and secure communications terminals 103 and 109, as for example, secure telephones.

In one example, such a system may operate by digitizing, storing and forwarding voice data in one of secure communications terminals 103 and 109. Secure communications terminals 103 and 109 may comprise secure telephone units, for example, and data communications network 120 may comprise a telephone system, for example.

As used herein, the words "telephone" or "communications terminal" are intended to include any device for transmitting information including but not limited to audio information, facsimile, messages, video, computer data, graphic data and/or combinations thereof, and the words "voice" or "data" or "voice data" are intended to include these and all other types of transmissible information (e.g., telex, teletype, voicemail, Morse code, packet data, and/or other message carrying vehicles).

Input data are encrypted in terminal 103 or 109 and subsequently transmitted via data links 107 and data communications network 120 to, for example, another of secure conununications terminal 109 or 103, wherein the encryption and digitizing processes are reversed, providing plain-text data equivalent to the original input data. Alternative transmission media, such as radio links, packet-switched data networks, dedicated lines, satellite links, microwave links and/or other communications channels alone or in combination are usefully employed in lieu of data links 107 and data communications network 120. Modems, which can be external or internal to secure communications terminals 103 and 109, are conventionally employed for communicating digital data streams over telephone lines or other communications links.

The present invention overcomes the problems of the prior art by providing within one or both of terminals 103 and/or 109 an apparatus and method for rapidly initiating the encrypting and decrypting of messages according to one of several possible protocols that both terminals can understand.

FIG. 2 is an illustration of a portion of a message sequence for automatically initiating secure communication between terminals A and B (e.g., terminals 103 and 109) in the public key mode in accordance with the present invention. As schematically illustrated in FIG. 2, the public key management mode involves exchange of three messages, identified as (i) Authentication Package for Data (APD) Message 210, (ii) Random Component Message (RCM) 230 and (iii) Cryptographic Synchronization (CS) Message 250. Each of these messages is desirably of a predetermined length comprising a series of bytes. Each byte desirably contains information of a specific type (e.g., available encryption devices, modem type, etc.) and the complete message is formed, for example, by concatenating the appropriate group of bytes. Message (iv) comprises secure information exchange 270, initiating following exchange of messages (i) through (iii).

Authentication Package for Data (APD) Message 210 in this case provides: choice of key management mode, choice of key generator (KG) algorithm selected, a cipher key (e.g., a user public key), certification authority for the terminal, the terminal serial number, the security activation key serial number, a public key expiration date and any additional terminal capabilities (e.g., user classification and/or user compartment list).

EXAMPLE I

FIG. 3 is a simplified block diagram of portion 365 of a secure communications system in accordance with the present invention. Portion 365 comprises key certification authority 370 and secure terminals 380 and 390, for example. Secure terminals 380 and 390 are analogous to secure terminals 103 and 109 of FIG. 1, for example. Secure terminals 380 and 390 are coupled to key certification authority 370 via data links 376 and 378, respectively. Data links 376 and 378 are analogous to links 107, 109 of FIG. 1.

Key certification authority 370 contains a plurality of enciphering and deciphering public keys including encryption public key three 372 and decryption public key three 374. Encryption public key three 372 is not communicated to other secure terminals and so is known as a "private" key.

In an initial or key certification phase, decryption public key three 374 is provided to secure terminals 380 and 390, along with other keys (discussed infra).

Secure terminal 380 has decryption public key one 382 (marked PK1D in FIG. 3) and encryption public key one encrypted with encryption public key three 384 (marked $(PK1E)^{PK3E}$ in FIG. 3) in addition to decryption public key three and encryption public key one (not shown in secure terminal 380), all of which are obtained from key certification authority 370 a first preferred embodiment of the present invention.

In an second preferred embodiment of the present invention, public keys such as decryption public key one 382 and a corresponding encryption key (e.g., PK1E, not shown in FIG. 3) are generated within a secure terminal such as secure terminal 380 and PK1E is sent to a key certification authority such as key certification authority 370. The key certification authority then encrypts PK1E to form encryption public key one encrypted with encryption public key three 384 ($(PK1E)^{PK3E}$) which is then sent back to secure terminal 380.

Similarly, in the first preferred enlbodiment of the present invention, secure terminal 390 has decryption public key two 392 (marked PK2D in FIG. 3) and encryption public key two encrypted with encryption public key three 394 (marked $(PK2E)^{PK3E}$ in FIG. 3) in addition to decryption public key three and encryption public key two (not shown in secure terminal 390), all of which are obtained from key certification authority 370.

During a subsequent or secure communications phase, messages such as APD 210 (FIG. 2) are exchanged. Secure terminal 390, for example, is given a copy of encryption public key one encrypted with encryption public key three 384 together with information identifying encryption public key three 372 as the key used to encrypt the exchanged key.

Secure terminal 390 is thus able to decrypt encryption public key one encrypted with encryption public key three 384 and to then use decrypted encryption public key one (not shown, analogous to encryption public key one PK1E) to encrypt a subsequent message transmitted to secure terminal 380.

Secure terminal 380 is given a copy of encryption public key two encrypted with encryption public key three 394 by secure terminal 390, together with information identifying encryption public key three 372 as the key used to encrypt the exchanged key.

Secure terminal 380 is thus able to decrypt encryption public key two encrypted with encryption public key three 394 to obtain decrypted encryption public key two (not shown, analogous to encryption key PK2E) and to then use this decrypted key to encrypt a subsequent message transmitted to secure terminal 390.

Secure terminals 380 and 390 are thus able to encrypt and decrypt exchanged messages. Because key certification authority 370 does not reveal encryption public key 372, encrypted encryption keys 384 and 394 as stored in secure terminals 380 and 390, respectively, can only have been obtained from key certification authority 370 and so possession of encrypted encryption keys such as 384 or 394 comprises authenticated authorization to engage in secure communications.

The method illustrated in FIG. 4 comprises steps of exchanging Authentication Package for Data (APD) Messages (block 210) and proceeding to a loop (blocks 219, 221 and 222) when the APD Message has been received. The loop (blocks 219, 221 and 222) includes steps of checking a next cipher algorithm (block 219), determining (block 221) if a suitable cipher algorithm has been identified (i.e., one common to both terminals), and verifying that all cipher algorithms have been checked (block 222), followed by a step of proceeding (block 224) when a cipher algorithm match has been located (block 221), or terminating communication (block 218) if all cipher algorithms have been checked without finding a match.

By way of example and not intended to be limiting, consider the case where only two possible key generators designated KG1 and DES are included and the DES key generator is given preferred status in the event that both KG1 and DES are common to the two terminals.

The capabilities of the terminals are indicated by specific bytes or groups of (e.g., eight) bits, within an overall message. Specific bits of a specific byte are used to indicate a given capability according to a predetermined protocol. For example, the leading bit of the key generator capability byte can be chosen to represent a capability for a proprietary key generator, with the next bit chosen to represent a capability for a DES-type key generator. A similar convention can be employed for other terminal capabilities.

In this situation the method concludes the APD message exchange with one of four possible outcomes: (i) if no match is found between the two terminals, the call is terminated; (ii) if only the KG1 mode is common to the two terminals, the KG1 key generator is used; (iii) if only the DES key generator is common to the two terminals, the DES key generator is used and (iv) if both the DES and the KG1 modes are common to both terminals, the DES key generator is used.

Similar outcomes apply for longer lists of key generator capabilities, with the highest common preferred status key generator being chosen for continued communication. The order of preference of key generators may be pre-programmed into the terminals or transmitted as part of the APD or other message.

APD exchange (block 210) provides information identifying certified user authentication information, the certified user public key, and the certified information expiration date. This message is processed using public key cryptography to encrypt and decrypt the message according to means well known in the art.

Figure 5:
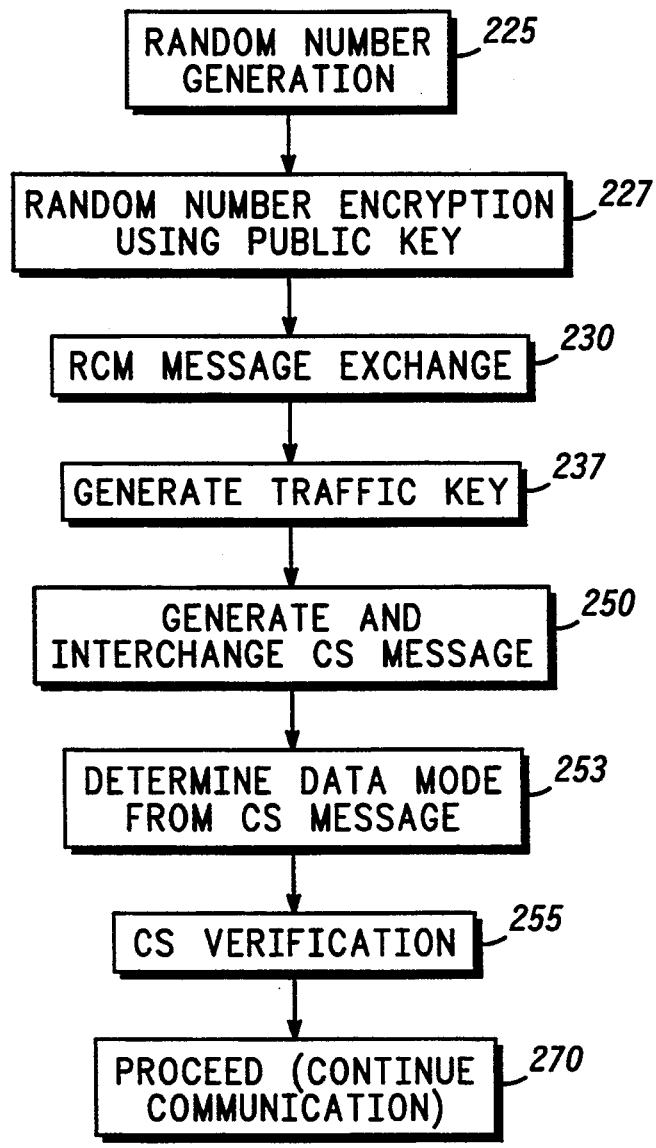
FIG. 5 is a flow chart illustrating further details of a portion of the message exchange of FIG. 2 for establishing secure communication in accordance with the preferred embodiment of the present invention.

FIG. 5 is a flow chart illustrating the exchange of second, third, and fourth messages 230, 250 and 270 (FIG. 2) to determine validity of terminal credentials, setting. up traffic keys, synchronizing the encryption/decryption process and initiating secure communication. The following steps are performed in accordance with the present invention: Random Component Message exchange 230, Cryptographic Synchronization Message exchange 250 and initiation of secure communication 270. Cryptographic synchronization verification (block 255) is also desirable for establishing secure communication (block 270).

FIG. 5 comprises steps of random number generation (block 225), random number encryption using, for example, public key cryptography (block 227), and Random Component Message exchange (block 230) and traffic key generation (block 237). The method further includes steps of Cryptographic Synchronization message generation and transmission (block 250), data mode determination (block 233), cryptographic synchronization verification (block 255) and continuation of communication (block 270).

A random number is generated in each terminal (block 225) and sent to the other terminal after being encrypted, for example, using the public key received in the APD. Thus, each Random Component Message (RCM) exchanged (block 230) contains a random number, generated (block 225) by the communications terminal originating the exchanged RCM. This random number should be of sufficient length to provide a traffic key for any of the key generators employed in the secure communications system.

This first random number is also stored in the originating terminal and combined (block 237) with a second random number decrypted from a Random Component Message returned by the other terminal. The combined first and second random numbers form a third random number.

Meanwhile, the same thing is happening in the other terminal wherein the received (first) random number is combined with the internally generated (second) random number to produce the same third random number. The third random number is used as a traffic key for the selected (block 221 of FIG. 4) key generator for both the terminals, and is loaded therein starting with, for example, the most significant bit.

Any unused bits in the traffic key are discarded, allowing a single apparatus to generate varying traffic key lengths to accommodate the potentially differing requirements of a plurality of key generators.

The first random number is encrypted (block 227) prior to incorporation into and exchange of RCM (block 230) by, for example, use of the certified user public key contained in the received Authentication Package for Data (block 210). The same thing is also done to the second random number coming from the other terminal.

One method for combining the first and second random values (block 237) is modulo-two addition, readily implemented by exclusive-ORing the random numbers in a bit-wise fashion, as is well known in the art. However, other techniques and methods well known in the art for combining binary numbers may also be used.

Cryptographic Synchronization (CS) Message (block 250) delivers: traffic modality (voice, data, etc.) information, cryptographic information as required and cryptographic synchronization verification. A linear feedback shift register, or LFSR, (not shown) may be employed as a portion of the cryptographic apparatus. Linear feedback shift registers require a starting value or seed. The seed is an example of cryptographic information which may be required as a part of the CS message (block 250). LFSR's are well known in the art.

A preferred method for KG synchronization verification is to transmit data which are an encrypted version of a known, or check, data pattern. These data are generated by loading an LFSR with a seed, synchronizing the transmit LFSR and transmit KG, and then encrypting the seed and the check pattern using the transmit LFSR and KG. When these received data are decrypted by the receiving secure communications terminal, the received seed is loaded into the receive LFSR and the check data pattern is compared to a stored version thereof. A match between these is indicative of cryptographic synchronization of the secure communications terminals.

These steps thus allow secure communications terminals having multiple cryptographic capabilities to automatically (i) select an appropriate cryptographic mode from a predetermined hierarchy of cryptographic modes, (ii) carry out appropriate terminal identification and user authorization, (iii) exchange traffic keys via a public key or another method, (iv) effect cryptographic communications synchronization and verification and (v) initiate secure communications.

The foregoing steps are carried out in a fashion which is largely operator transparent, increasing system security and requiring less knowledge of detailed cryptographic procedures and methods of the operator.

Authentication Package for Data (APD) Message 210 (FIG. 2) provides information for determining which key management mode to employ, which KG algorithm to select, which traffic key within the manual key data base to use, and any additional terminal capabilities.

Cryptographic Synchronization message 250 exchange (FIG. 5) provides information specifying the traffic mode (voice, data, etc.), seed values for the linear feedback shift register and/or KG starting points, and also allows KG synchronization verification.

Figure 6:
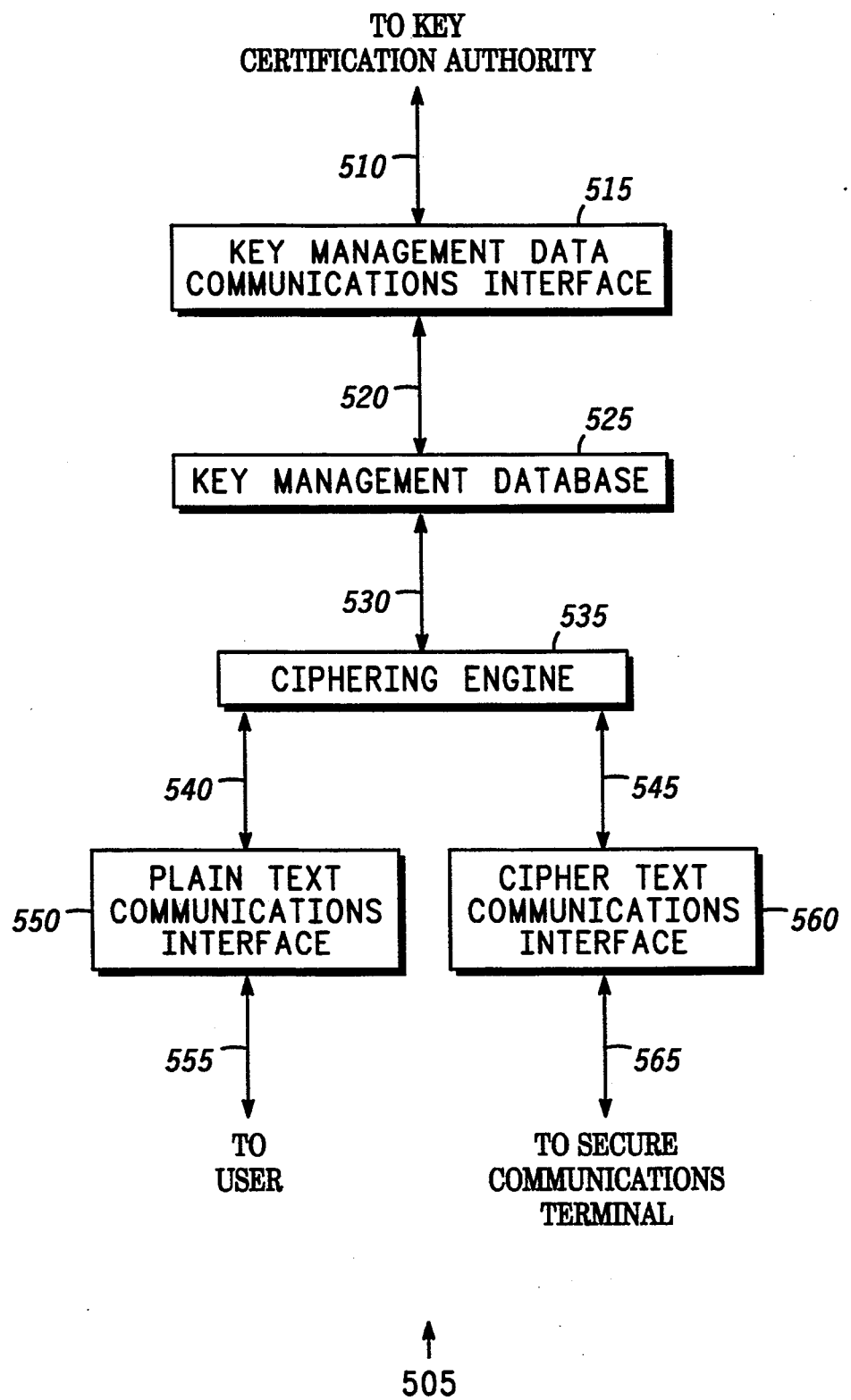
FIG. 6 is a simplified block diagram of a portion of a secure communications apparatus in accordance with the present invention.

FIG. 6 is a simplified block diagram of portion 505 of a secure communications apparatus in accordance with the present invention. Portion 505 comprises key management data communications interface 515 coupled via link 510 to a key certification authority (not shown) and coupled via link 520 to key management database 525. Key management database 525 is coupled via link 530 to ciphering engine 535. Ciphering engine 535 is coupled via link 540 to plain text communications interface 550 having plaintext output at link 555. Link 555 communicates plaintext to the user (not shown). Ciphering engine 535 is coupled via link 545 to ciphertext communications interface 560 having ciphertext output at link 565.

Links 510 and 565 are analogous to data links 107 (FIG. 1) and similarly may comprise radio links, packet-switched data networks, fiber optic links, dedicated lines and/or other communications channels. Link 565 is coupled to another cipher text communications interface in another secure communications terminal (not shown). Link 555 is analogous, for example, to a telephone handset or other data input/output device as is well known to those of skill in the relevant arts.

In a preferred embodiment of the present invention, plain text communications interface 550 and cipher text communications interface 560 each comprise a Type 68302 micro-controller chip manufactured by Motorola, Inc., of Phoenix, Ariz. Ciphering engine 535 and key management database 525 comprise a Type DSP 56001 high speed digital signal processing chip manufactured by Motorola, Inc., of Phoenix, Ariz., custom large scale integrated circuitry implementing a specific cryptographic algorithm obtained from Motorola, Inc., of Phoenix, Ariz. and has a programmable logic array, desirably a 3090 or a 3064 programmable logic array available from Xilinx of Santa Clara, Calif., which interfaces ciphering engine 535 to cipher text communications interface 560 and to plain text communications interface 550. Ciphering engine 535 performs numerically intensive computations associated with encryption and decryption of, for example, public key encoded data and other similarly computationally involved tasks.

Alternatively, the functions of ciphering engine 535 may be realized through other choices of specific integrated circuitry or in software or may be memory based, as is well known to those of skill in the relevant arts.

One of the Type 68302 micro-controllers is used to process data and to provide input/output capabilities while the second Type 68302 microprocessor chip provides only input/output capabilities. The two Type 68302 microcontrollers share RAM, desirably realized as Hitachi 62256 and 628128 random access memory circuits. The two Type 68302 micro-controllers also share ROM, desirably realized as a 512 kiloByte flash EEPROM such as, by way of example, a Type 28F001 integrated circuit, available from Intel of Palo Alto, Calif.

A preferred embodiment of the modem function (key management data communications interface 515, cipher text communications interface 560 and key management data communications interface 510) is a custom version of a Type V.26 modem, or alternatively, a Type V.32 modem, having the training sequence modified slightly to be compatible, for example, with the training sequence employed in STU-Type (e.g., STU-III) secure telephony equipment as manufactured by Motorola, Inc., of Scottsdale, Ariz. Modems of these types are obtained from Universal Data Systems, a subsidiary of Motorola, Inc., located in Huntsville, Ala. However, other modems or methods of communication can also be used.

EXAMPLE II

The contents of a 144 byte long APD message which fulfills a set of secure communications requirements are provided in detail in Tables I and II below.

Field

APD Message Identification
Terminal Type
Authority Identification
ID for Current Version of Public Key
ID for Previous Version of Public Key
KG Mode Capabilities Description
Key Management Capability Table I. Fields comprising 16 bytes of data in header of authentication packet for data.

Field

User Identification
User IDS
SAK Serial Number
Terminal Serial Number (TSN)
User Classification
User Compartment List
Public Key Expiration Date
Public Key Table II. 128 bytes and purpose comprising Authentication Packet. These 128 bytes (1024 bits) are transmitted as encrypted by the key certification authority with a privately held public encryption key and correspond to an authentication message.

The Authentication Package for Data described in Tables I and II reduces the number of bytes which must be exchanged between two terminals in order to establish a secure communication channel from the 368 bytes employed in the arrangement described in "Hierarchical Key Management System" by R. Foster, R. Pfeifer and T. Mihm, U.S. Pat. No. 4,888,801 (incorporated herein by reference) to 144 bytes and provides a proportional savings in the time required to exchange these data between two terminals.

The two fields labelled "ID for Current Version of Public Key" and "ID for Previous Version of Public Key" allow automatic choice of the current or the previous public key as given by the key certification authority. This public key will be used to decrypt the second portion of the APD message. This arrangement allows secure communication when one party has received the new key version and the other party has not yet received the updated key. The arrangement operates by automatically determining if the current or the previous key in either terminal is common with either the current or previous key in the other terminal and then using the con, non key for communication.

Examples of the kinds of information typically contained in the Terminal Type category include, for example, voice terminals, data terminals or key certification authorities.

The User ID is an alphanumeric code comprising one or more display lines (e.g., a user name) while the User IDS is a numeric serial number identifying the user. The SAK (security activation key) serial number is a serial number for the public key used (by the key certification authority) to encrypt the APD message body, while the terminal serial number identifies the sending terminal. The User Classification and User Compartment List allow the users of the secure network to set classification levels and compartments as required by their needs.

The public key contained in the APD is decrypted using the public decryption key (previously obtained from the key certification authority) by the receiving terminal and is used to decrypt the Random Component Message (message 230, FIG. 2) containing a random number. The random number is used to generate a traffic variable for secure communication.

Secure communication is then carried out in a mode (e.g., DES, other proprietary algorithms such as DVI of Motorola, Inc., Scottsdale, Ariz.) which is more rapidly and easily employed for communication of arbitrary-length messages than is public key cryptography.

A further time savings is realized by combining information previously contained in two messages, the Access Domain and Capabilities Message (AD&C) and the Authentication Message (AM), which had been sent by first exchanging AD&C Messages, processing the AD&C Messages anti then exchanging AMs.

The combined APD Message eliminates the delay incurred between the AD&C and AM Messages during which the: AD&C Message had been processed, resulting in faster processing time for the capability and authentication information.

Thus, a method and apparatus have been described which overcome specific problems and accomplish certain advantages relative to prior art methods and mechanisms. The method and apparatus provide a flexible signalling plan for data using multiple key management schemata including public, private, master/slave, distributor/recipient and other secure communications arrangements. The improvements over known technology are significant. The time required in order to initiate secure communications using low bit rate channels is reduced without sacrifice of the integrity and robust qualities of secure communications processes.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

We claim:

1. A method for establishing a communications link between first and second terminals for exchanging encrypted information, wherein the first and second terminals follow a procedure including steps of:
   (a) exchanging a first message containing plaintext information identifying encryption devices and communication modes available within the first and second terminals and containing public key encrypted information describing user authentication information;
   (b) selecting in at least one of the first and second terminals a common key generation and encryption and decryption methods;
   (c) exchanging a second message containing public-key encrypted data for forming traffic keys;
   (d) exchanging a third message for synchronizing encrypted communications; and
   (e) initiating encrypted communication.

2. A method as claimed in claim 1, wherein said step (a) further includes steps of:
   (a1) forming in the first terminal a first portion of the first message which contains data indicating a message type, a first terminal type, a label identifying a public decryption key and a label identifying encryption and decryption capabilities of the first terminal, the first portion being plaintext;
   (a2) forming in the first terminal a second portion of the first message which contains user identification information, a security activation key serial number, a terminal serial number for the first terminal, a public key expiration date and a first public key encryption vector; and
   (a3) forming the second portion of the first message using a fourth message from a key certification authority which may be decrypted using the public decryption key labelled in the first portion of the first message formed in the first terminal.

3. A method as claimed in claim 2, wherein said step (c) further includes steps of:
   (c1) generating a first pseudorandom number in the first terminal;
   (c2) encrypting the first pseudorandom number using the first public key encryption vector to provide a first encrypted pseudorandom number in the first terminal;
   (c3) generating a second pseudorandom number in the second terminal;
   (c4) encrypting the second pseudorandom number using a second public key encryption vector to provide a second encrypted pseudorandom number in the second terminal;
   (c5) exchanging the first and second encrypted pseudorandom numbers between the first and second terminals; and
   (c6) forming identical traffic keys in the first and second terminals from the first and second pseudorandom numbers.

4. A method as claimed in claim 3, wherein said step (c6) further includes steps of:
   (c7) decrypting the second encrypted pseudorandom number in the first terminal to provide a decrypted second pseudorandom number;
   (c8) combining the decrypted second pseudorandom number with the first pseudorandom number to form a third pseudorandom number, the third pseudorandom number comprising a first traffic key; and
   (c9) using the first traffic key as an encryption and decryption key for the common encryption and decryption methods selected in said step (b).

5. A method as claimed in claim 3, wherein said step (c6) further includes steps of:
   (c10) decrypting the first encrypted pseudorandom number in the second terminal to provide a decrypted first pseudorandom number;
   (c11) combining the decrypted first pseudorandom number with the second pseudorandom number to form a fourth pseudorandom number, the fourth pseudorandom number comprising a second traffic key; and
   (c12) using the second traffic key as an encryption and decryption for the common encryption and decryption methods selected in said step (b).

6. A method as claimed in claim 1, wherein said step (d) further includes steps of:
   (d1) encrypting a known data pattern using the information from said step (c) to provide an encrypted known data pattern;
   (d2) transmitting the encrypted known data pattern;
   (d3) receiving the encrypted known data pattern as a received encrypted known data pattern;
   (d4) decrypting the received encrypted known data pattern using a traffic key derived from said step (c) to form a decrypted received encrypted known data pattern; and
   (d5) comparing the decrypted received encrypted known data pattern to a stored known data pattern to determine agreement.

7. A method for establishing a communication link between at least a first and a second terminal, wherein each of the first and second terminals follows a procedure comprising steps of:
   (a) transmitting a first message comprising an Authentication Package for Data, the Authentication Package for Data identifying encryption and decryption capabilities, certified user authentication data and a first public encryption key;
   (b) receiving a second message comprising an Authentication Package for Data, the Authentication Package for Data identifying encryption and decryption capabilities, certified user authentication data and a second public encryption key;
   (c) transmitting a first Random Component Message including a first pseudorandom number;
   (d) receiving a second Random Component Message including a second pseudorandom number;
   (e) forming a traffic key from the first and second pseudorandom numbers;
   (f) interchanging Cryptographic Synchronization messages; and
   (g) initiating interchange of encrypted information.

8. A method as claimed in claim 7, wherein said step (a) further includes steps of:
   (a1) identifying encryption and decryption capabilities in plaintext;
   (a2) identifying a third public decryption key in plaintext;
   (a3) identifying a security activation key serial number in public key encrypted ciphertext; and
   (a4) providing a public key encryption vector in ciphertext encrypted using a third encryption key which is privately held in a key certifying authority.

9. A method as claimed in claim 8, wherein said step (a) further includes steps of:
   (a5) identifying a terminal serial number in public key encrypted ciphertext encrypted using the third enciphering key;
   (a6) identifying a first public key encryption vector expiration date in public key encrypted ciphertext encrypted using the third encryption key; and
   (a7) providing the first public key encryption vector in public key encrypted ciphertext encrypted using the third encryption key.

10. A method as claimed in claim 7, wherein said step (a) further includes steps of:
   exchanging a first portion or header of the Authentication Package for Data which is plaintext; and
   exchanging a second part or body of the Authentication Package for Data encrypted using a public encryption key corresponding to the third public decryption key, wherein the third public decryption key is labelled in the first portion or header of the Authentication Package for Data.

11. A method as claimed in claim 7, wherein said step (a) further includes a step of selecting encryption and decryption algorithms common to both the first and second terminals according to an automatic programmed hierarchy of encrypted information interchange methods.

12. An apparatus for providing encrypted communication between first and second terminals, said apparatus comprising:
   means for encrypting and decrypting using a plurality of different encryption and decryption algorithms;
   means for transmitting messages, said transmitting means coupled to said encrypting and decrypting means;
   means for receiving messages, said receiving means coupled to said encrypting and decrypting means; and
   controller means coupled to said encrypting and decrypting, transmitting and receiving means, said controller means, transmitting means and receiving means for:
   (i) sending a first message to said second terminal, the first message comprising a first plaintext portion providing information identifying encryption and decryption algorithms and communication modes available within said first terminal and comprising a second encrypted portion identifying terminal authentication information;
   (ii) sending a second message to said second terminal for providing pseudorandom data; and
   (iii) initiating encrypted communication with said second terminal using a traffic key formed from said pseudoramdom data.

13. An apparatus as claimed in claim 12, wherein said controller means further comprises means for sending a third message to said second terminal for synchronizing said encrypted communication.

14. An apparatus as claimed in claim 12, wherein said receiving means further comprises means for receiving from said second terminal plaintext information identifying encryption and decryption algorithms and communication modes available in said second terminal and wherein said controller means further comprises means for selecting encryption and decryption algorithms and a data rate common to said first and second terminals.

15. An apparatus as claimed in claim 14, further comprising means for storing within said apparatus information concerning which encryption and decryption algorithms and conununication modes are preferred, so that if more than one encryption and decryption algorithm or communication mode are common to said first and second terminals, said controller means automatically chooses an encryption and decryption algorithm or communication mode to be used, according to stored preference information.

16. An apparatus as claimed in claim 12, further comprising means for generating a first pseudorandom number for transmission to said second terminal, said generating means coupled to said encrypting and decrypting means and to said transmitting means.

17. An apparatus as claimed in claim 16, further comprising means for combining said first pseudorandom number with a second pseudorandom number received from said second terminal to form said traffic key for encrypting messages sent therebetween, said combining means coupled to said encrypting and decrypting means and to said generating means.

18. A communication apparatus comprising:
   means for providing different encryption modes, decryption modes and conununication modes;
   means for sending messages including a first capabilities and authentication message to and receiving messages including a second capabilities and authentication message from another conununication apparatus, said first and said second capabilities and authentication messages having predetermined plaintext data fields identifying said different encryption modes, decryption modes and communication modes resident in said communication apparatus and in said another communication apparatus, having further predetermined plaintext data fields labelling current and previous public decryption keys and having predetermined encrypted data fields providing a user public key; and
   means for comparing said first and said second capabilities and authentication messages to identify and select compatible encryption modes, compatible decryption modes and compatible communication modes according to a stored preference protocol.

19. An apparatus as claimed in claim 18, further including:
   means for generating, encrypting and transmitting a first pseudorandom number to said another communication apparatus;
   means for receiving and decrypting a second pseudorandom nunsher from said another communication apparatus; and
   means for combining said first and second pseudorandom numbers to form a traffic key for use with said compatible encryption mode.

20. An apparatus as claimed in claim 19, further including:

means for decrypting said predetermined encrypted data fields of said second capabilities and authentication message from said another communication apparatus to decrypt said user public key to provide a decrypted user public key; and wherein said receiving and decrypting means employs said decrypted user public key to decrypt said second pseudorandom number.

* * * * *